No. 831,000. PATENTED SEPT. 11, 1906.
C. B. HOWARD.
NOSE BAG.
APPLICATION FILED MAR. 27, 1906.
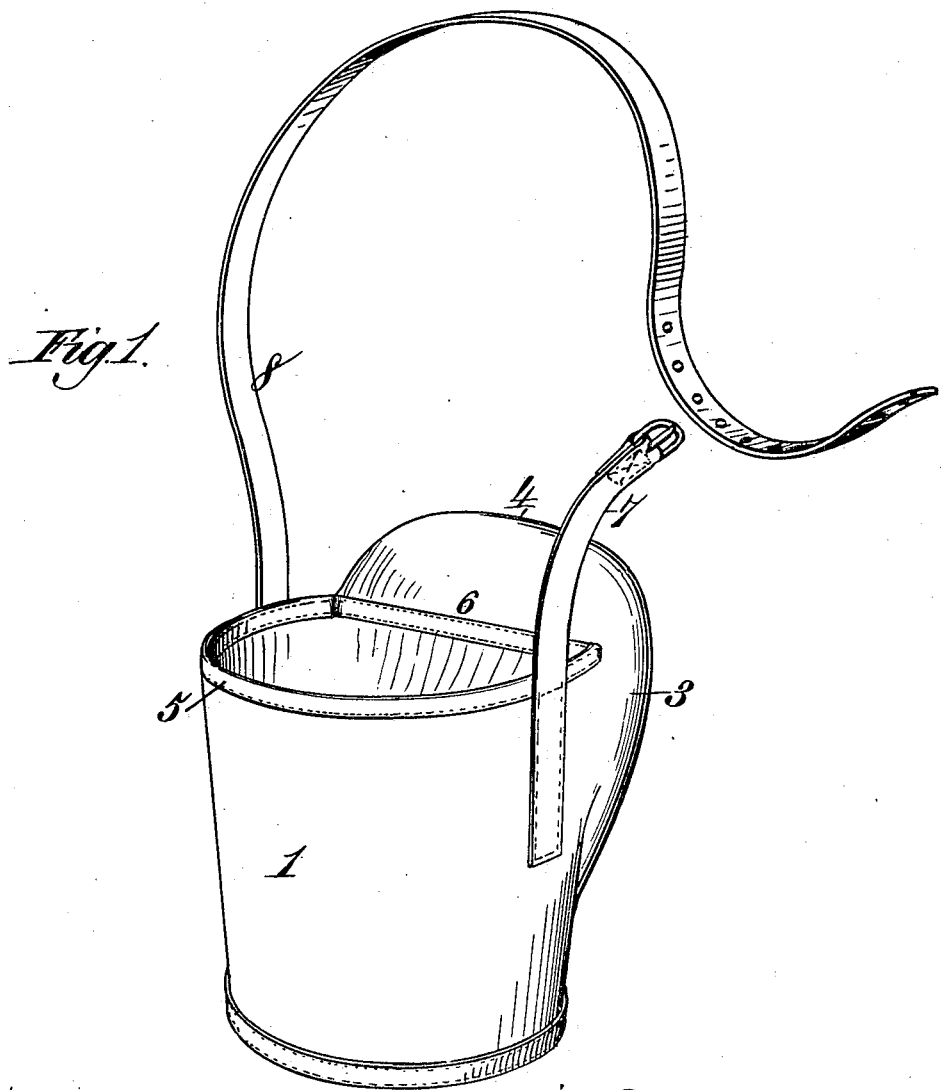
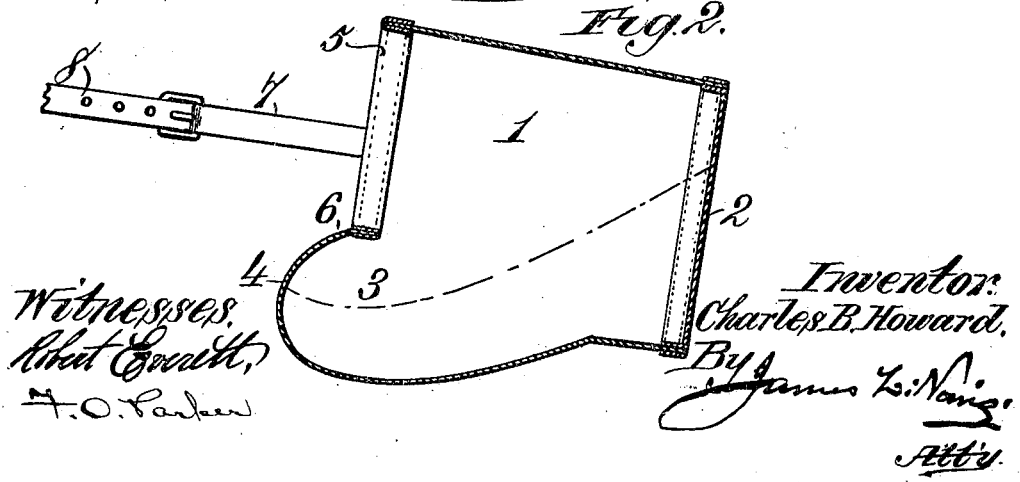

UNITED STATES PATENT OFFICE.

CHARLES B. HOWARD, OF HEYBURN, IDAHO.

NOSE-BAG.

No. 831,000.     Specification of Letters Patent.     Patented Sept. 11, 1906.

Application filed March 27, 1906. Serial No. 308,284.

*To all whom it may concern:*

Be it known that I, CHARLES B. HOWARD, a citizen of the United States, residing at Heyburn, in the county of Lincoln and State of Idaho, have invented new and useful Improvements in Nose-Bags, of which the following is a specification.

This invention relates to feed or nose bags for horses and other animals of that type having means for preventing the loss of feed from the bag by the movement of the head of the animal in an endeavor to obtain or reach the grain, particularly when the latter is located near the bottom of the bag or after it has become nearly exhausted.

The means for preventing the loss or spilling of feed from the bag, as contemplated by the present invention, consists of a pocket at the rear upper portion of the device and integrally formed with or made as a part of the bag-body by allowing fullness necessary for this purpose, the pocket being so arranged as to avoid the least modification of the inner area or capacity of the bag and permit the animal to have unobstructed access to the entire bag-bottom.

A further advantage of the improved nose-bag is that the chin or any other part of the muzzle of the animal will not be in the least injured by the bag when the latter is applied.

A still further advantage is that when the nose-bag is tilted by the animal in an endeavor to reach the feed it will be impossible for the feed or grain to escape or spill, and immediately upon restoration of the bag into normal or approximately normal position the feed will run back toward the bottom of the bag without obstruction.

In the drawings, Figure 1 is a perspective view of the feed or nose bag embodying the features of the invention. Fig. 2 is a transverse section thereof shown in maximum tilted position and illustrating the disposal of the feed or grain therein under such conditions.

Similar numerals of reference are employed to indicate corresponding parts in the views.

The numeral 1 designates the body of the bag, which may be of any suitable material—such as canvas, rubber cloth, or any other fabric that may be applicable for the purpose. A stiff bottom 2 is secured to the body 1 and may also be of any suitable material.
The rear portion of the body 1 is fulled or so shaped as to form a rear pocket 3, which converges gradually at its lower extremity into the bottom of the bag, as shown, and is projected, as at 4, above the mouth of the bag by turning the terminal of the portion of the material of the bag utilized in forming the pocket downwardly, thus producing a pocket having considerable capacity at a point where the escape or spilling of the feed or grain usually ensues, particularly when a nose-bag is thrown up by the animal to which it is applied in an effort to reach all of the feed and also during other nervous movements of the animal. The top of the body 1 has a stiff rim 5, secured thereto and terminating at opposite sides of the pocket or in line with the inturned terminal 6 of the latter, which is drawn straight across from one terminal to the other of the said rim and is preferably folded over or hemmed to render the same durable and effective as a securing means with respect to the rim. By arranging the inturned extremity 6 of the pocket in the manner just set forth and as shown the said pocket will always be held open or in condition to receive the feed or grain from the bag-body, particularly when the bag is thrown up or tilted to a maximum extent, as indicated by Fig. 2, and when the bag is in this position it will be seen that the feed or grain will be thrown rearwardly into the pocket and that it will be impossible for it to escape or spill over the inturned terminal 6, the latter projecting inwardly far enough with respect to the body 1 to obviate any tendency to spilling. The inturned terminal 6 of the pocket is projected inwardly within the area of the bag-body and occupies a chord relation with respect to the circular rim of the bag, thus reducing the rearward extent of the bag-rim; but the bottom of the bag has the same full diameter as the bag-body, and thereby the inturned terminal of the top of the pocket is located over a portion of the bottom. Furthermore, it will be seen that the lower extremity of the pocket which converges into the body is at a considerable distance above the bottom 2 of the bag, so as to throw all the grain or feed forward when the bag is in normal or approximately normal position and obviate any necessity of the animal reaching back to obtain the feed. Moreover, the pocket is wholly in rear of the bag-body and does not in the least modify the inner area or containing capacity of the bag as originally devised and as considered with respect to ordinary nose-bags now in use.

The rear pocket 3 bulges at opposite sides, as shown by Fig. 1, and the portion of the body 1 into which the said pocket continues is correspondingly bulged, particularly in rear of the points of attachment of the connecting-straps 7 and 8. As before indicated, the lower terminal of the pocket is at a distance above the bottom 2 of the body, and between the inturned terminal 6 of the pocket and the bottom 2 there is no obstruction of any kind, the pocket being fully open from top to bottom with respect to the interior of the body 1. The depth of the body 1 below the lower terminal of the pocket 3 is such as to normally contain the feed disposed in the bag, the pocket serving only as a means for receiving the feed from the body 1 when the nose-bag is thrown upward into the position illustrated by Fig. 2. The pocket 3 does not serve as a means for supplying feed to the bag.

To apply the improved nose-bag, straps 7 and 8 are attached to opposite portions thereof, the terminal of the strap 7 carrying a buckle and the terminal of the strap 8 suitably apertured to adjustably engage the said buckle, a construction well understood in the art. It is also obvious that any other adjustable fastening means may be used. It will also be understood that changes in the proportions and dimensions of the several parts specified may be adopted.

Another advantage in the improved bag structure is the economy in forming the same, as the pattern for the bag-body may include such contour as to embody the pocket 3 in one piece or continuous with the bag-body and overcome the necessity for extra seams, and also facilitate the production of the bag with the improved form of pocket without increasing the cost of manufacture.

Having thus described the invention, what is claimed is—

1. A nose-bag having the material of the body thereof increased in fullness and length at the rear portion to provide a pocket, the upper terminal of the pocket being inturned above the upper edge of the body and extended transversely across the top of the bag from one portion of the rim to another part of the latter, the increased fullness of the body at the rear terminating at its lower extremity above the bottom of the bag, the said pocket also having an unobstructed opening with respect to the interior of the bag throughout its full length and the bottom of the bag projected rearwardly beyond the point of attachment of the upper inturned terminal of the pocket.

2. A nose-bag having a body with a rim extending around the major portion of the upper edge thereof, the material of the body at the rear being increased in fullness and of greater vertical length than the remaining part of the body and inturned at the upper terminal thereof and secured to the opposite terminals of the rim to form a pocket, the increase in the fullness in the body of the bag to form the pocket having a greater length in a longitudinal direction than the depth of the bag to permit the upper inturned terminal thereof to normally project above the rim, the inturned upper extremity of the pocket extending transversely across the top of the bag and curtailing the circumferential extent of the latter, the pocket having unobstructed communication throughout the length of the inner portion thereof with the interior of the bag and the increased fullness of material to form the pocket terminating at a point above the bottom of the bag, the bottom of the bag projecting rearwardly in complete circumferential form beyond the upper inturned terminal of the pocket.

In testimony whereof I have hereunto set my hand in presence of two subscribing witnesses.

CHARLES B. HOWARD.

Witnesses:
 CHAS. S. HEYER,
 JAMES L. NORRIS.